United States Patent
Handa

(10) Patent No.: US 10,295,121 B2
(45) Date of Patent: May 21, 2019

(54) CONTROL METHOD FOR FUEL FILLING SYSTEM

(71) Applicant: HONDA MOTOR CO., LTD., Tokyo (JP)

(72) Inventor: Kiyoshi Handa, Wako (JP)

(73) Assignee: HONDA MOTOR CO. LTD., Tokyo (JP)

( * ) Notice: Subject to any disclaimer, the term of this patent is extended or adjusted under 35 U.S.C. 154(b) by 0 days.

(21) Appl. No.: 14/580,481

(22) Filed: Dec. 23, 2014

(65) Prior Publication Data
US 2015/0184804 A1 Jul. 2, 2015

(30) Foreign Application Priority Data
Dec. 26, 2013 (JP) ................................. 2013-269736

(51) Int. Cl.
*F17C 5/06* (2006.01)
*F17C 13/02* (2006.01)

(52) U.S. Cl.
CPC .............. *F17C 5/06* (2013.01); *F17C 13/026* (2013.01); *F17C 13/028* (2013.01);
(Continued)

(58) Field of Classification Search
CPC ..... Y02E 60/324; Y02E 60/321; Y02E 60/50; F17C 5/06
(Continued)

(56) References Cited

U.S. PATENT DOCUMENTS 4,731,730 A * 3/1988 Hedrick .............. G01F 23/0069
340/450.2
5,029,622 A * 7/1991 Mutter .................... F17C 5/007
137/79
(Continued)

FOREIGN PATENT DOCUMENTS

DE   1 2009 005 107 T5   9/2012
DE  11 2009 005 107 T5   9/2012
(Continued)

OTHER PUBLICATIONS

German Patent and Trademark Office, Search Report corresponding to German Patent Appln. No. 10 2014 226 959.8, dated Feb. 24, 2017.
(Continued)

*Primary Examiner* — Jason K Niesz
*Assistant Examiner* — James R Hakomaki
(74) *Attorney, Agent, or Firm* — Squire Patton Boggs (US) LLP

(57) ABSTRACT

A control method for a hydrogen filling system is provided. A hydrogen filling system (S) includes a vehicle (V) that sends unique information (V, MC) of the hydrogen tank and detected values (T, P) of sensors, and a station (9) that determines a filling mode based on this information (V, MC, P, T), and fills hydrogen to the tank in this determined mode. A station ECU (95) calculates predicted values (T', P') of the temperature and pressure inside of the hydrogen tank during filling of hydrogen based on the unique information (V, MC), continuously confirms whether the detected values (T, P) of the sensors and the predicted values (T', P') match while filling fuel, and in the case of an inconsistency between the detected values and predicted values being confirmed, interrupts filling of fuel in the filling mode determined based on the unique information.

10 Claims, 4 Drawing Sheets

(52) U.S. Cl.
CPC ........... *F17C 2203/0604* (2013.01); *F17C 2203/0646* (2013.01); *F17C 2205/013* (2013.01); *F17C 2221/012* (2013.01); *F17C 2223/0123* (2013.01); *F17C 2223/036* (2013.01); *F17C 2225/0123* (2013.01); *F17C 2225/036* (2013.01); *F17C 2227/0337* (2013.01); *F17C 2227/04* (2013.01); *F17C 2250/032* (2013.01); *F17C 2250/034* (2013.01); *F17C 2250/043* (2013.01); *F17C 2250/0439* (2013.01); *F17C 2250/0621* (2013.01); *F17C 2250/0631* (2013.01); *F17C 2250/0636* (2013.01); *F17C 2250/075* (2013.01); *F17C 2260/022* (2013.01); *F17C 2260/023* (2013.01); *F17C 2265/065* (2013.01); *F17C 2270/0168* (2013.01); *F17C 2270/0184* (2013.01); *Y02E 60/321* (2013.01); *Y02E 60/324* (2013.01)

(58) Field of Classification Search
USPC .............................................. 141/1
See application file for complete search history.

(56) References Cited

U.S. PATENT DOCUMENTS

| | | | | |
|---|---|---|---|---|
| 6,294,276 | B1* | 9/2001 | Ogino | B01B 1/005 420/900 |
| 2002/0014277 | A1* | 2/2002 | Togasawa | F16K 17/30 141/95 |
| 2002/0053365 | A1* | 5/2002 | Mutter | F17C 5/06 141/4 |
| 2004/0055378 | A1* | 3/2004 | Shost | F02M 37/10 73/291 |
| 2005/0247123 | A1* | 11/2005 | Fuse | G01F 15/0755 73/290 R |
| 2007/0051423 | A1* | 3/2007 | Handa | F17C 5/00 141/94 |
| 2009/0110990 | A1* | 4/2009 | Izutani | C01B 3/00 429/410 |
| 2010/0276031 | A1* | 11/2010 | Saiki | C01B 3/00 141/1 |
| 2010/0307636 | A1* | 12/2010 | Uemura | F17C 5/06 141/4 |
| 2011/0200900 | A1* | 8/2011 | Harris | H01M 8/04223 429/429 |
| 2011/0259469 | A1* | 10/2011 | Harty | F17C 5/007 141/4 |
| 2012/0000574 | A1 | 1/2012 | Nishiumi | |
| 2012/0227864 | A1* | 9/2012 | Mori | F17C 5/06 141/95 |
| 2012/0318378 | A1* | 12/2012 | Yahashi | B60K 15/077 137/334 |
| 2013/0014854 | A1* | 1/2013 | Mori | F17C 5/007 141/1 |
| 2013/0014855 | A1* | 1/2013 | Yahashi | G01M 3/26 141/1 |
| 2013/0037165 | A1* | 2/2013 | Okawachi | F17C 5/06 141/4 |
| 2013/0139897 | A1 | 6/2013 | Kim et al. | |
| 2014/0290790 | A1 | 10/2014 | Mathison | |
| 2014/0295305 | A1* | 10/2014 | Wake | H01M 8/04223 429/429 |

FOREIGN PATENT DOCUMENTS

| | | |
|---|---|---|
| DE | 10 2012 209 842 A1 | 6/2013 |
| JP | 0785883 A * | 3/1995 |
| JP | 2007138973 A * | 6/2007 |
| JP | 2011-122657 A | 6/2011 |
| JP | 2013-527390 A | 6/2013 |

OTHER PUBLICATIONS

German Patent and Trademark Office, Office Action corresponding to German Patent Appln. No. 10 2014 226 959.8, dated Feb. 24, 2017.

* cited by examiner

CONTROL METHOD FOR FUEL FILLING SYSTEM

This application is based on and claims the benefit of priority from Japanese Patent Application No. 2013-269736, filed on 26 Dec. 2013, the content of which is incorporated herein by reference.

BACKGROUND OF THE INVENTION

Field of the Invention

The present invention relates to a control method for a fuel filling system.

Related Art

Fuel cell vehicles travel by supplying air and hydrogen to the fuel cell, and driving an electric motor using the electric power thereby generated. In recent years, progress has been made in the practical implementation of fuel cell vehicles employing such fuel cells as the energy source for generating motive power. Hydrogen is required to generate electric power by fuel cells. In recent years, vehicles have become mainstream that store a sufficient amount of hydrogen in advance in a high-pressure tank or a hydrogen tank equipped with a storage alloy, and use the hydrogen inside of the tank to travel. In concert with this, vigorous research has progressed also in the technology designated as so-called communicative filling for quickly filling the required amount of hydrogen into the tank.

Communicative filling is technology that sends information related to a hydrogen tank to a station as a data signal using some kind of communication means from the vehicle side, and performs filling control based on the data signal received at the station. Sensors that detect temperature and/or pressure of the hydrogen gas inside the hydrogen tank are provided to the hydrogen tank. From the vehicle side, data signals including information related to the temperature and/or pressure of the hydrogen tank (hereinafter, this information related to the temperature, pressure, etc. of the hydrogen tank is collectively referred to as tank state information) based on the outputs of these sensors are sent to the station side. The station side fills hydrogen based on the acquired tank state information, in an appropriate mode according to the state of the hydrogen tank at this time.

Patent Document 1 describes technology for determining abnormalities such as in various sensors of the hydrogen tank used in the above such communicative filling. With the invention of Patent Document 1, hydrogen gas is filled at a predetermined constant flow rate from starting filling until a predetermined time elapses. With this invention, the temperature inside the hydrogen take after initial filling is predicted based on the flow rate, temperature, etc. of hydrogen gas released from the station to the vehicle at initial filling, this predicted value and an actual detected value of the temperature sensor after initial filling are compared, and in the case of these greatly diverging, it is determined that an abnormality has arisen in the temperature sensor, etc., and measures are taken such as a reduction in filling flow rate, interruption, and notification of the abnormality.

Patent Document 1: Japanese Unexamined Patent Application, Publication No. 2011-122657

SUMMARY OF THE INVENTION

Although the invention of Patent Document 1 is technology for determining an abnormality based on a comparison between the predicted value for the temperature inside of the hydrogen tank during filling and the detected value of a sensor in this way, it can only determine an abnormality in a time so short that the influence of the heat release from the hydrogen tank can be ignored. This is because, a short time later after starting filling, the energy dissipation increases, and thus the prediction accuracy of the temperature inside the hydrogen tank declines. In addition, in such a short time immediately after filling start, it is considered that significant fluctuation in the temperature inside of the hydrogen tank does not occur so much that can determine an abnormality accurately based on the comparison between the predicted value and detected value.

In addition, with the invention of Patent Document 1, in order to raise the prediction accuracy of the temperature inside of the hydrogen tank as much as possible, and thus raise the determination accuracy of abnormalities as much as possible, the flow rate during initial filling must be reduced on the order of $1/10$ to $1/20$ that of during main filling. For this reason, even in a case of there not being an abnormality in a sensor or the like, the time required in refilling lengthens.

The present invention has an object of providing a control method for a fuel filling system that can accurately determine that an abnormality has arisen in sensors, the hydrogen tank, etc., without lengthening the time required in filling more than necessary.

A control method for a fuel filling system (e.g., the hydrogen filling system S, Sa described later) according to a first aspect of the present invention fills fuel to a fuel tank (e.g., the hydrogen tank 31 described later) equipped to a fuel cell vehicle (e.g., the fuel cell vehicle V, Va described later), includes the steps of: determining a filling mode based on a detected value (T, P) of a sensor (e.g., the temperature sensor 41, pressure sensor 42 described later) detecting a value of a predetermined physical quantity related to the state of fuel inside of the fuel tank and unique information (V, M) of the fuel tank, and then filling fuel to the fuel tank in the filling mode thus determined (e.g., the filling control executed by the station ECU 95 described later); predicting the value of the physical quantity during filling of fuel based on the unique information (e.g., the characteristic prediction operation executed by the station ECU 95 described later); and continuously confirming whether the detected value of the sensor and the predicted value in the step of predicting match, while filling fuel in the filling mode determined based on the unique information (e.g., the verification processing executed by the station ECU 95 described later), in which the filling of fuel in the filling mode determined based on the unique information is interrupted in the step of determining, in the case of inconsistency between the detected value and the predicted value being confirmed in the step of confirming.

According to a second aspect, in this case, it is preferable for the unique information to include a value (V, MC) of a parameter related to a heat release characteristic of the fuel tank during filling of fuel, and the physical quantity to be the temperature of fuel gas in the fuel tank.

According to a third aspect, in this case, it is preferable for the unique information to include a volume value (V) of the fuel tank, and the physical quantity to be the pressure inside the fuel tank.

According to a fourth aspect, in this case, it is preferable for the fuel filling system (e.g., the hydrogen filling system S described later) to be divided into the fuel cell vehicle (e.g., the fuel cell vehicle V described later) and an external filling device (e.g., the station 9 described later) that fills fuel into the fuel cell vehicle, in which the fuel cell vehicle includes: the fuel tank, the sensor, and a communication device (e.g., the communicative filling ECU 6, infrared communication device 5 described later) that sends data signals including information related to the detected value of the sensor and the unique information to the external filling device, and the steps of determining, predicting and confirming are performed on a side of the fuel filling system.

According to a fifth aspect, in this case, it is preferable for the fuel filling system (e.g., the hydrogen filling system Sa) to be divided into the fuel cell vehicle (e.g., the fuel cell vehicle Va described later) and an external filling device that fills fuel into the fuel cell vehicle, in which the fuel cell vehicle includes: the fuel tank, the sensor, and a communication device that sends data signals including information related to the detected value of the sensor and the unique information to the external filling device, the steps of predicting and confirming are performed on a side of the fuel cell vehicle, and the step of determining is performed on a side of the fuel filling system.

With the fuel filling system of the first aspect of the present invention, fuel is filled in a filling mode determined based on the detected values of predetermined physical quantities detected by sensors and the unique information of the fuel tank. In addition, while filling fuel according to the step of determining in this way, the value of a predetermined physical quantity that is the detection target of a sensor is predicted based on the unique information, it is continuously confirmed whether this predicted value and the detected value of the sensor match, and in the case of an inconsistency between the detected value and predicted value being confirmed, the filling of fuel in the filling mode determined based on the unique information is interrupted. In the present invention, since the predicted value of a physical quantity is calculated using unique information of the fuel tank in this way, it is possible to accurately calculate the predicted value not only during the initial filling which can be adiabatically approximated, but also after initial filling in which it is necessary to release heat from the fuel tank. In addition, by using a predicted value calculated in this way, it is possible to accurately determine an abnormality in a sensor, fuel tank, etc. continuously during filling of fuel. In addition, according to the present invention, by calculating the predicted value based on the unique information of the fuel tank, since it is not necessary to decrease the filling flow rate in order to raise the prediction accuracy, the time required in filling will not lengthen more than necessary.

In the second aspect of the present invention, the value of a parameter related to the heat release characteristic of the fuel tank during the filling of fuel is included in the unique information as an input parameter for determining the filling mode, and further calculating predicted values. It is thereby possible to accurately calculate the predicted value of the temperature of fuel inside the fuel tank during filling, and thus abnormalities in sensors, fuel tank, etc. can be accurately determined.

In the third aspect of the present invention, the volume value of the fuel tank is included in the unique information as an input parameter for determining the filling mode, and further calculating predicted values. It is thereby possible to accurately calculate the predicted value of pressure inside the fuel tank during the filling of fuel, and thus abnormalities in sensors, fuel tank, etc. can be accurately determined.

In the fourth aspect of the present invention, the fuel cell vehicle sends data signals corresponding to detected values of sensors and unique information of the fuel tank to the external filling device, and the external filling device calculates predicted values using the data signals thus sent, and then further compares between the predicted values and detected values. By bearing the calculation function of predicted values which has a relatively large computational load, etc. on the external filling device side, and then the vehicle side bearing the transmission function of data signals which has a relative small computational load in this way, it is possible to simplify the configuration of the vehicle. In addition, by bearing the calculation function of predicted values by the external filling device side, physical quantities that are easy to grasp on the external filling device side such as the temperature and flow rate of fuel released from the external filling device to the fuel tank can be further used; therefore, the prediction accuracy can be further improved.

In the fifth aspect of the present invention, predicted values are calculated, and then the predicted values and detected values are compared on the fuel cell vehicle side. By bearing the calculation function of predicted values, etc. by the fuel cell vehicle side in this way, it is possible to stably determine abnormalities in sensors, the fuel tank, etc., without being influenced by communication between the fuel cell vehicle and fuel filling device.

DETAILED DESCRIPTION OF THE INVENTION

Hereinafter, an embodiment of the present invention will be explained while referencing the drawings.

Figure 1:
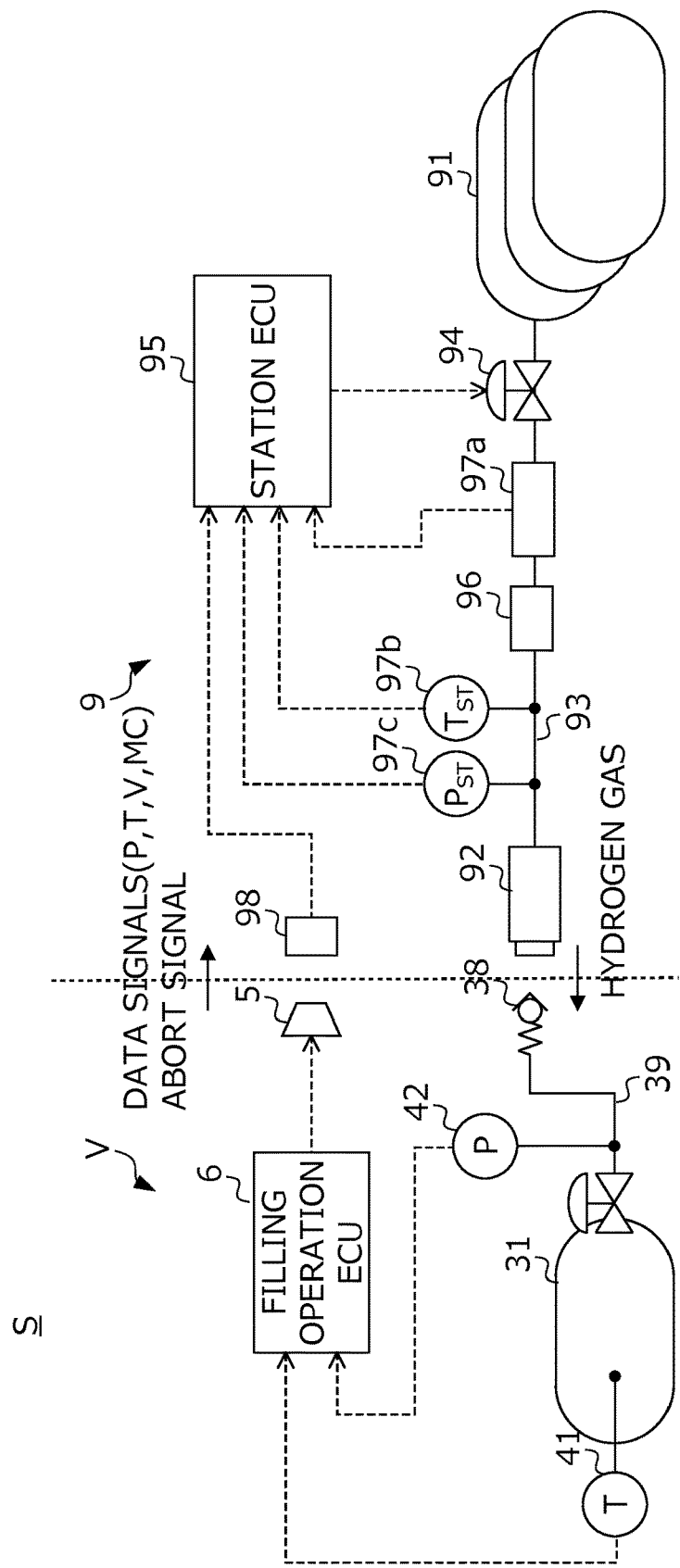
FIG. 1 is a view showing the configuration of a hydrogen filling system according to an embodiment of the present invention.

FIG. 1 is a view showing the configuration of a hydrogen filling system S related to the present embodiment. The hydrogen filling system S is configured by combining a fuel cell vehicle V that travels with hydrogen as fuel gas, and a hydrogen station 9 that supplies hydrogen fuel to a hydrogen tank 31 of this vehicle V. Hereinafter, the configuration on the hydrogen station 9 side will be explained first, and then the configuration of the fuel cell vehicle V side will be explained.

The hydrogen station 9 includes: a hydrogen storage tank 91 in which hydrogen gas for supplying the vehicle V is stored at high pressure, a filling channel 93 that leads from the hydrogen storage tank 91 to a filler nozzle 92 which is directly handled by an operator, a flow-rate control valve 94 that is provided in the filling channel 93, and a station ECU 95 that opens/closes the flow-rate control valve 94.

The station ECU 95 determines the filling mode following a sequence explained later (variable modes of filling flow rate during filling) when the filler nozzle 92 is connected to a receptacle 38 provided to the vehicle V, and opens/closes the flow-rate control valve 94 so that this filling mode is realized. The hydrogen gas released from the filler nozzle 92 is filled into the hydrogen tank 31 via the receptacle 38.

A condenser 96 for cooling the hydrogen gas is provided in the filling channel 93 between the flow-rate control valve 94 and the filler nozzle 92. By cooling the hydrogen gas at a position before filling to the hydrogen tank 31 by way of such a condenser 96, a temperature rise of the hydrogen gas in the hydrogen tank 31 is suppressed, and thus rapid filling becomes possible.

Various sensors 97a, 97b and 97c for grasping the state of the hydrogen gas at a position before filling to the hydrogen tank 31 are connected to the station ECU 95.

A flow meter 97a is provided in the filling channel 93 between the flow-rate control valve 94 and the condenser 96, and sends a signal corresponding to the flow rate of hydrogen gas flowing in the channel 93 to the station ECU 95. Hereinafter, the flow rate of hydrogen gas detected by this flow meter 97a is referred to as filling flow rate, and the value thereof is expressed as dm/dt. In addition, the amount of hydrogen gas filled to the hydrogen tank 31 (hereinafter referred to as "total filling amount") is calculated by integrating the filling flow rate dm/dt, for example, and the value thereof is expressed as m hereinafter.

A temperature sensor 97b is provided in the filling channel 93 between the condenser 96 and the filler nozzle 92, and sends a signal corresponding to the temperature of hydrogen gas inside the channel 93 to the station ECU 95. Hereinafter, the temperature of hydrogen gas detected by this temperature sensor 97a is referred to as filling gas temperature, and the value thereof is expressed as $T_{ST}$.

A pressure sensor 97c is provided in the filling channel 93 between the condenser 96 and filler nozzle 92, and sends a signal corresponding to the pressure of hydrogen gas inside the channel 93 to the station ECU 95. Hereinafter, the pressure of hydrogen gas detected by this pressure sensor 97c is referred to as filling gas pressure, and the value thereof is expressed as $P_{ST}$.

An infrared communication device 98 for communicating with the vehicle V is provided to the filler nozzle 92. The infrared communication device 98 opposes an infrared communication device 5 described later that is provided to the vehicle V, when connecting the filler nozzle 92 to the receptacle 38, whereby the sending/receiving of data signals becomes possible via infrared rays between these communication devices 98 and 95. Hereinafter, communication via infrared rays between these communication devices 98 and 5 is referred to as IR communication.

The station ECU 95, upon filling of hydrogen gas to the vehicle V, can selectively execute the two filling methods of a filling method called communicative filling using the above-mentioned IR communication, and a communication method called non-communicative filling that does not use IR communication.

Communicative filling is a filling method of filling hydrogen gas to the vehicle V while performing IR communication between the vehicle V and the station 9. In communicative filling, the station ECU 95 receives data signals including information related to the hydrogen tank 31 of the vehicle V by way of the infrared communication device 98, and fills hydrogen gas to the hydrogen tank 31 in a filling mode decided based on these data signals. The station ECU 95 successively calculates a filling ratio (hereinafter also referred to as "hydrogen SOC") of hydrogen inside the hydrogen tank 31 by a known method, based on the data signals received during communicative filling, determines that filling of hydrogen gas has completed in the case of this hydrogen SOC exceeding a predetermined refilling threshold, and then ends the filling of hydrogen gas. In addition, the station ECU 95 interrupts the filling of hydrogen gas using the data signals in a case of the temperature inside the hydrogen tank 31 reaching a predetermined fail temperature, a case of not being able to receive data signals, or a case of receiving an abort signal described later during communicative filling, even if the hydrogen SOC has not reached the refilling threshold. For this reason, in communicative filling, it is important to determine the filling mode so that the temperature inside the hydrogen tank 31 does not exceed the fail temperature until arriving at refilling, and that hydrogen gas is filled as quickly as possible.

In addition, this communicative filling is divided into a filling method called general communicative filling and a filling method called unique communicative filling, depending on the types of information included in the data signals sent from the vehicle V to the station 9, i.e. types of information used in filling control executed by the station ECU 95.

With general communicative filling, data signals including tank state information constituted by the temperature, pressure, etc. of the hydrogen tank 31 are sent from the vehicle V side. It should be noted that, in the present invention, tank state information is defined as being the values of physical amounts detected by sensors provided in the hydrogen tank 31, such as the temperature and pressure of hydrogen gas inside the hydrogen tank 31. The station ECU 95 receives data signals including tank state information sent from the vehicle V, and fills hydrogen gas in a filling mode that was determined based on these data signals.

With unique communicative filling, data signals including unique information of the hydrogen tank 31, in addition to the above-mentioned tank state information, are sent from the vehicle V side. In the present invention, unique information of the hydrogen tank 31, for example, is defined as being values representing the heat release characteristics of the hydrogen tank 31 such as the heat capacity value or MC parameter value (e.g., refer to Japanese Unexamined Patent Application (Translation of PCT Publication), Publication No. 2013-527390 by the applicants of the present application), volume value of the hydrogen tank 31, material of the liner of the hydrogen tank 31, structural information of the hydrogen tank, etc., and basically values that can be specified by performing experiments at the time when the hydrogen tank 31 is manufactured. The station ECU 95 receives data signals including the tank state information and tank unique information received from the vehicle V, and fills hydrogen gas in a filling mode determined based on these data signals.

Herein, unique communicative filling and general communicative filling will be compared. In unique communicative filling, unique information of the hydrogen tank 31 that is not sent in general communicative filling is sent to the station side. Since this unique information includes values representing the heat release characteristic, etc. as mentioned above, it is possible to determine the optimum filling mode in accordance not only with the physical state inside the hydrogen tank 31 at this time, but also with the characteristics of the hydrogen tank 31, by grasping the characteristics of the hydrogen tank 31 equipped to the vehicle (suitability of heat dissipation, etc.) in unique communicative filling. For this reason, if comparing between unique communicative filling and general communicative filling, unique communicative filling can refill faster. With general communicative filling, since the station cannot grasp the characteristics of the hydrogen tank 31, assuming a hydrogen tank of the worst thermal characteristics upon performing high-speed filling, a margin must be provided in the filling flow rate or the like so that the temperature during filling does not excessively rise, and thus the time required for refilling becomes longer than unique communicative filling. In particular, when using unique information, since the influence of heat release from the surface of the hydrogen tank 31 during filling can be accurately grasped, it is possible to accurately predict the temperature inside of the hydrogen tank 31 during filling and at the filling completion predicted time with unique communicative filling. In this way, with unique communicative filling, the station ECU 95 can fill hydrogen while accurately predicting the future state of the hydrogen tank 31; therefore, it is possible to refill more quickly comparing to the above-mentioned general communicative filling, while making so that the temperature of the hydrogen tank 31 does not surpass the above-mentioned fail temperature.

Incidentally, a specific sequence of a novel algorithm for unique communicative filling that is the MC technique is shown in Japanese Unexamined Patent Application (Translation of PCT Publication), Publication No. 2013-527390 by the applicants of the present application. In order to predict the temperature inside of the hydrogen tank 31 at the filling completion predicted time, it is necessary to estimate the heat amount absorbed at the tank wall during filling. In addition, to strictly calculate this heat amount absorbed at the tank wall, the temperature distribution solution of the tank wall during filling is necessary; however, it is very difficult to obtain this. The MC technique predicts the temperature inside of the hydrogen tank 31 during filling while considering the heat release from the tank wall, by introducing the composite value MC (kJ/K) of the mass and specific heat capacity to simplify this operation (refer to FIG. 5, etc. of Japanese Unexamined Patent Application (Translation of PCT Publication), Publication No. 2013-527390). The unique information defined in the present invention also includes an MC parameter value used in unique communicative filling based on such an MC technique, a unique constant value of the hydrogen tank 31 that is necessary for calculating this MC parameter following an algorithm established in advance, etc.

Non-communicative filling is a filling method of filling hydrogen to the vehicle V without performing IR communication between the vehicle V and the station 9. In non-communicative filling, the station ECU 95 fills hydrogen gas to the hydrogen tank 31 in a prescribed filling mode established in advance. The station ECU 95 cannot grasp the current state of the hydrogen tank 31 during non-communicative filling; therefore, filling is ended at a low pressure compared with communicative filling (i.e. low filling ratio), so that excess filling or excess temperature rise does not occur during filling. Therefore, when comparing between the above-mentioned two of communicative filling and non-communicative filling, communicative filling can fill until complete refilling or closer in the vicinity thereof due to filling while grasping the state of the hydrogen tank 31.

The fuel cell vehicle V includes the hydrogen tank 31 that stores hydrogen gas supplied from the station 9, a fuel cell system (not illustrated) that generates power from the hydrogen gas stored in this hydrogen tank 31 to travel using the generated electric power, an infrared communication device 5 that sends data signals related to the hydrogen tank 31 to the infrared communication device 98 of the station 9 during communicative filling, and a filling operation ECU 6 that generates data signals to be sent from this infrared communication device 5.

The hydrogen tank 31 is connected with the receptacle 38 by a hydrogen introduction line 39. In other words, hydrogen gas discharged from the hydrogen filler nozzle 92 connected to the receptacle 38 is filled to the hydrogen tank 31 via the hydrogen introduction line 39.

As a means for acquiring the aforementioned information related to the hydrogen tank 31, a temperature sensor 41 and pressure sensor 42 are connected to the communication operation ECU 6. The temperature sensor 41 detects the temperature of hydrogen gas inside of the hydrogen tank 31, and sends a signal corresponding to the detected value to the communication operation ECU 6. Hereinafter, the temperature of hydrogen gas inside of the hydrogen tank 31 detected by this temperature sensor 41 is referred to as tank internal temperature, and the value thereof is expressed as T. The pressure sensor 42 detects the pressure inside of the hydrogen tank 31, and sends a signal corresponding to the detected value to the communication operation ECU 6. Hereinafter, the pressure of hydrogen gas inside of the hydrogen tank 31 detected by this pressure sensor 42 is referred to as tank internal pressure, and the value thereof is expressed as P. In addition, hereinafter, the value of the tank internal pressure immediately prior to filling start in particular is expressed as $P_0$, and the amount of rise in tank internal pressure from filling is expressed as $\Delta P$ (=$P-P_0$).

The communication operation ECU 6 is a computer including a microcomputer, and is configured to include a CPU (central processing unit), storage media such as ROM and RAM, as well as electronic circuits such as various interfaces. Unique information related to the equipped hydrogen tank 31 is recorded in the ROM of the communication operation ECU 6 at the time at which the vehicle V is manufactured. The communication operation ECU 6 sends information related to the hydrogen tank 31 to the station ECU 95 via the infrared communication device 5; therefore, it generates data signals according to the detected value T of the tank internal temperature, detected value P of the tank internal pressure and unique information. Hereinafter, a case of sending the two parameters of the volume value V of the hydrogen tank 31 and the aforementioned MC parameter value MC as unique information will be explained; however, the types of unique information are not to be limited to these. It should be noted that the aforementioned pressure rise $\Delta P$ can be calculated by the communication operation ECU 6, and sent to the station ECU 95 together with the abovementioned detected values T and P, or can be calculated by the station ECU 95 based on the detected value P sent from the communication operation ECU 6. Hereinafter, a case of the pressure rise $\Delta P$ being calculated by the station ECU 95 will be explained.

The infrared communication device 5 is configured by an infrared LED, a driver thereof, etc., for example. The driver causes the infrared LED to switch on and off in a mode according to the data signals and abort signal generated by the communication operation ECU 6.

Next, a specific sequence of unique communicative filling of the hydrogen filling system S will be explained while referencing FIG. 2.

Figure 2:
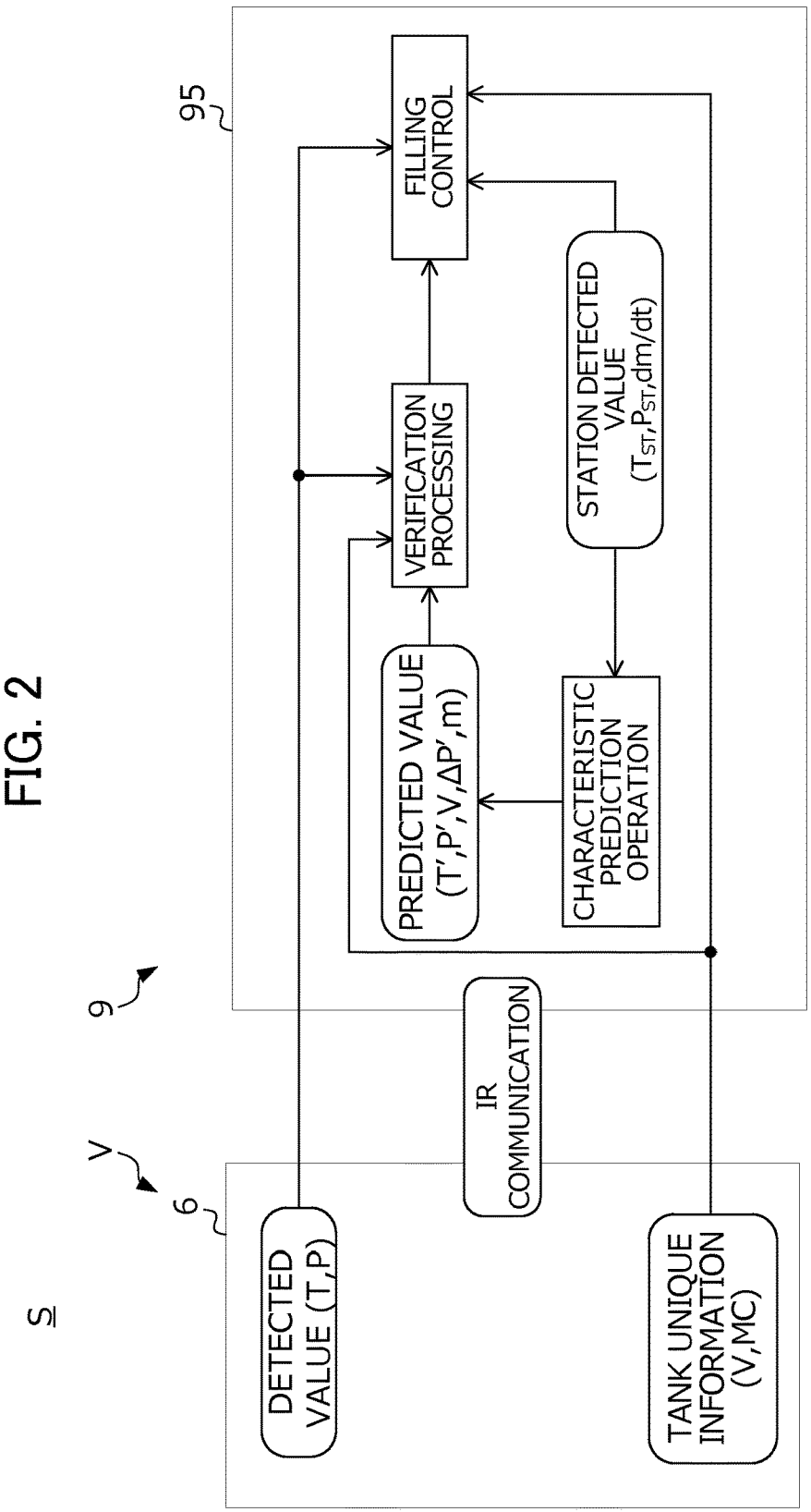
FIG. 2 is a functional block diagram showing a specific sequence of operations in unique communicative filling of a hydrogen filling system.

FIG. 2 is a functional block diagram showing a specific sequence of unique communicative filling of the hydrogen filling system S. The functions shown in FIG. 2 are realized by operations in the communication operation ECU 6 equipped to the vehicle, operations in the station ECU 95 equipped to the station, and IR communication between these ECUs 6 and 95.

The communication operation ECU 6 sends tank state information and tank unique information that is necessary upon executing unique communicative filling, to the station ECU 95 using IR communication. The information sent from the vehicle side to the station side, for example, is the four of the detected value T of the tank internal temperature, the detected value P of the tank internal pressure, the volume value V of the hydrogen tank, and the MC parameter value MC.

The station ECU 95 performs processing such as a characteristic prediction operation, verification processing and filling control, using information sent from the vehicle side (T, P, V, MC, etc.), information calculated on the station side based on the information sent from the vehicle side (ΔP, etc.), and information acquired by sensors on the station side (e.g., detected value $P_{ST}$ of filling gas pressure, detected value $T_{ST}$ of filling gas temperature, detected value dm/dt of filling flow rate, total filling amount m, etc.). Hereinafter, the specific sequences of these three types of processing executed in the station ECU 95 will be explained.

Characteristic Prediction Operation

In characteristic prediction operation, the station ECU 95 uses the acquired information (T, P, V, MC, ΔP, $P_{ST}$, $T_{ST}$, dm/dt, m, etc.) as input information, and during filling, successively calculates predicted values of predetermined physical amounts related to the state of the hydrogen tank during filling following a predetermined algorithm. Herein, "predict value of a physical amount" includes estimating a known value or transition of value in the future of a physical amount that is the target, based on values that can be grasped by the station ECU 95 at the time of executing the operation, or indirectly estimating the physical amount that is the target, by using parameters other than outputs of sensor that directly detect these. The physical amount predicted based on the above-mentioned plurality of input information (P, T, V, MC, ΔP, $P_{ST}$, $T_{ST}$, dm/dt, m, etc.) in the characteristic prediction operation, for example, is the five of a predetermined value T' of the tank internal temperature during filling, a predicted value P' of the tank internal pressure during filling, a predicted value ΔP' of the rise amount in tank internal pressure from filling, a predicted value V' of the volume of the hydrogen tank, and a predicted value m' of the total filling amount.

The predicted value T' for the tank internal temperature during filling can be calculated by inputting into an operation algorithm established in advance, among the above-mentioned input information, particularly the filling pressure detected value $P_{ST}$, filling temperature detected value $T_{ST}$, filling flow rate detected value dm/dt, MC parameter value MC and volume value V. It should be noted that, since the specific operation algorithm for calculating the temperature predicted value T' using the MC parameter value MC, etc. is described in Japanese Unexamined Patent Application (Translation of PCT Publication), Publication No. 2013-527390 by the applicants of the present application, a detailed explanation will be omitted herein.

The predicted value P' of the tank internal pressure during filling, for example, can be calculated based on, among the above-mentioned plurality of input information, in particular the filling pressure detected value $P_{ST}$, filling temperature detected value $T_{ST}$ and filling flow rate detected value dm/dt. More specifically, the predicted value P' is calculated by subtracting a pressure loss dP (e.g., estimated from the filling pressure detected value $P_{ST}$, filling temperature detected value $T_{ST}$ and filling flow rate detected value dm/dt) from the filling pressure detected value $P_{ST}$. The predicted value ΔP' for the rise amount in tank internal pressure from filling can be calculated using a predetermined state equation, for example, based on among the above-mentioned plurality of input information, in particular the total filling amount m, tank internal temperature detected value T and volume value V.

The volume predicted value V' of the hydrogen tank can be calculated using a predetermined state equation, for example, based on among the above-mentioned plurality of input information, in particular the total filling amount m, tank internal temperature detected value T and rise amount ΔP in tank internal pressure. In addition, the total filling amount predicted value m', for example, can be calculated using a predetermined state equation, based on among the above-mentioned plurality of input information, in particular the rise amount ΔP in tank internal pressure, volume value V and temperature detected value T.

Verification Processing

In verification processing, the station ECU 95 compares the five predicted values (T', P', V', ΔP', m') successively calculated by the above-mentioned characteristic prediction operation, and the actual values (T, P, V) successively sent from the vehicle side and actual values (ΔP, m) acquired on the station side during filling, and determines whether respective predicted values and actual values match.

More specifically, in verification processing, the station ECU 95 acquires the tank internal temperature T, tank internal pressure P and volume value V sequentially sent from the vehicle side during filling, as well as the pressure differential ΔP and filling flow rate m calculated based on these sent values, etc., then compares these with the temperature predicted value T', pressure predicted value P', volume predicted value V', predicted value ΔP' of pressure differential and predicted value m' of filling flow rate at times corresponding to the acquired times, and while performing unique communicative filling, continuously determines whether these predicted values T', P', V', ΔP' and m' are within predetermined acceptable error ranges centered around the actual values T, P, V, ΔP and m, respectively, and in the case of being within the ranges, determines as matching, and if outside the ranges, determines as not matching.

For example, a case of abnormality arising in the hydrogen tank equipped to the vehicle (more specifically, for example, a case of the hydrogen tank equipped to the vehicle having been replaced with a different type than that at the time of vehicle manufacture), a shift may arise in the MC parameter value MC and volume value V sent from the vehicle side from the original values of the hydrogen tank equipped at this time. In this case, the predicted values (T', P', ΔP', V', m') and actual values (T, P, ΔP, V, m) may be shifted. Therefore, according to verification processing, in the case of having determined that any among the above-mentioned predicted values do not match the respective actual values, it can be determined that abnormality has arisen in the hydrogen tank.

For example, a case of abnormality arising in the temperature sensor or pressure sensor equipped to the vehicle (more specifically, for example, a case of each sensor drift failing, case of offset failing, etc.), the tank internal temperature detected value T or tank internal pressure detected value P sent from the vehicle side may be shifted from the original value. In this case as well, the predicted values (T', P', ΔP', V', m') and actual values (T, P, ΔP, V, m) may be shifted. Therefore, according to verification processing, in the case of having determined that any among the above-mentioned predicted values do not match the respective actual values, it can be determined that abnormality has arisen in the temperature sensor or pressure sensor.

In addition, for example, in a case of abnormality arising in the communication operation ECU (more specifically, for example, a case of the communication operation ECU having been replaced to a different type than that equipped during vehicle manufacture, case of the communication operation ECU not working normally, case of corruption occurring in data signals, etc.), the tank internal temperature detected value T, tank internal pressure detected value P, volume value V, MC parameter value MC, etc. sent from the vehicle side may be shifted from the original values. In this case as well, the predicted values (T', P', ΔP', V', m') and actual values (T, P, ΔP, V, m) may be shifted. Therefore, according to verification processing, in the case of having determined that any among the above-mentioned predicted values do not match the respective actual values, it can be determined that abnormality has arisen in the communication operation ECU.

Figure 3:
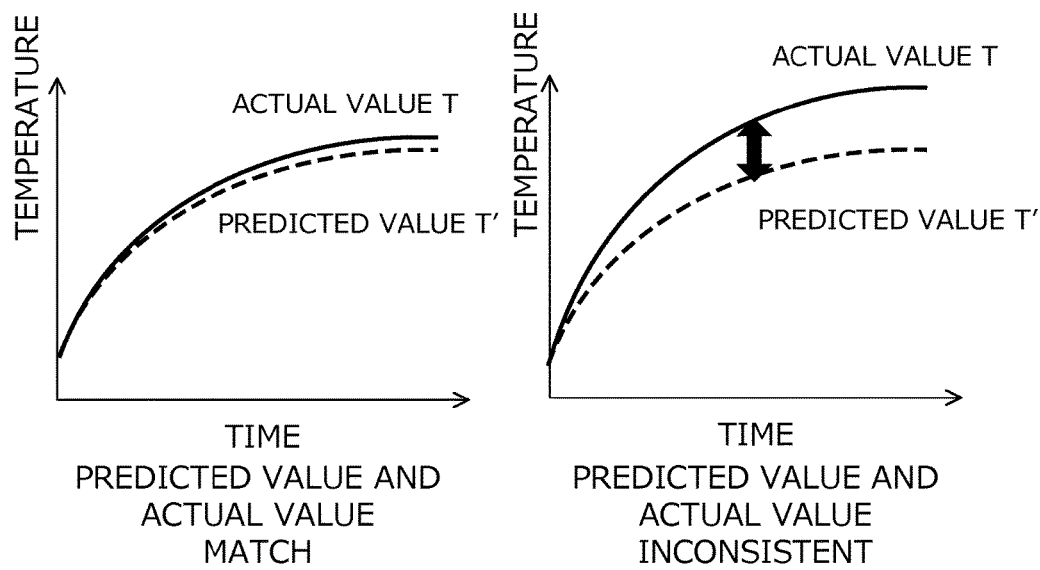
FIG. 3 provides graphs comparing a predicted value for the tank internal temperature calculated according to characteristic prediction operation during filling and a detected value sent from a vehicle.

FIG. 3 provides graphs comparing the tank internal temperature predicted value T' calculated by the characteristic prediction operation during filling and the tank internal temperature detected value T sent from the vehicle. FIG. 3 indicates the predicted value T' with a dotted line, and indicates the detected value T with a solid line.

As mentioned above, if a case of there not being abnormality in the hydrogen tank, sensors, etc., the transition of the predicted value T' calculated by characteristic prediction operation and the transition of the detected value T sent from the vehicle during filling will match substantially. In particular, with the present invention, upon calculating the predicted value T', since the MC parameter value MC related to the heat release characteristic of the hydrogen tank is used, the temperature from immediately after filling start until the time of filling end can be accurately predicted, as shown on the left side of FIG. 3.

On the other hand, in the case of the hydrogen tank having been replaced, in the case of the sensor equipped to the hydrogen tank having failed, in the case of abnormality arising in the communication operation ECU, etc., the transition of the predicted value T' calculated by characteristic prediction operation and the transition of the detected value T sent from the vehicle during filling will not match (refer to right side in FIG. 3). In addition, the divergence between the predicted value T' and the detected value T in the case of failure occurring is considered to increase as the change in temperature inside of the hydrogen tank increases, i.e. as the time elapsed since starting filling lengthens. Therefore, according to the present invention, by comparing between the predicted value and actual value not only at the time of filling start, but continuously while filling, and then determining the existence of abnormality, in the case of an abnormality arising, it is possible to accurately detect this.

Filling Control

Referring back to FIG. 2, in filling control, the station ECU 9 determines the filling mode based on information (P, T, V, MC) related to the hydrogen tank sent from the vehicle V, information ($P_{ST}$, $T_{ST}$) acquired by sensors provided on the station side, and predicted values (P', T') calculated by characteristic prediction operation, and controls the filling flow rate so that the determined filling mode is realized. More specifically, the station ECU 9 determines the filling mode so that the predicted value T' of the tank internal temperature at the filling end predicted time calculated by the characteristic prediction operation does not exceed the aforementioned fail temperature. It should be noted that the filling flow rate during filling may be made variable from filling start to end, or may be fixed.

In addition, the station ECU 9 interrupts filling of hydrogen gas in the first established filing mode, in the case of determining that any of the respective predicted values (T', P', ΔP', V', m') do not match the actual values (I, P, ΔP, V, m) according to the above-mentioned verification processing, while filling hydrogen gas in a filling mode determined based on information including the unique information (V, MC) of the hydrogen tank. It should be noted that, after interrupting the filling of hydrogen gas in the first established filling mode, filling of hydrogen gas may be continued by switching to a slower filling mode considering that abnormality has arisen in the hydrogen tank, sensor, etc. on the vehicle side as mentioned above, or filling of hydrogen gas may be ended (filling flow rate dm/dt=0). It should be noted that, in the case of continuing filling of hydrogen gas by switching the filling mode, a new filling mode is preferably determined so that the filling flow rate and filling pressure are smaller after switching than before switching, by considering that an abnormality exists in the hydrogen tank, sensors, etc.

Although an embodiment of the present invention is explained above, the present invention is not to be limited thereto. For example, in the above-mentioned embodiment, a case of executing the characteristic prediction operation to calculate the predicted value T' of the tank internal temperature, predicted value P' of the tank internal pressure, etc. and the verification processing to determine the consistency between these predicted values and actual values by the station ECU on the station side; however, these two types of processing can also be executed by the communication operation ECU equipped to the vehicle V.

Figure 4:
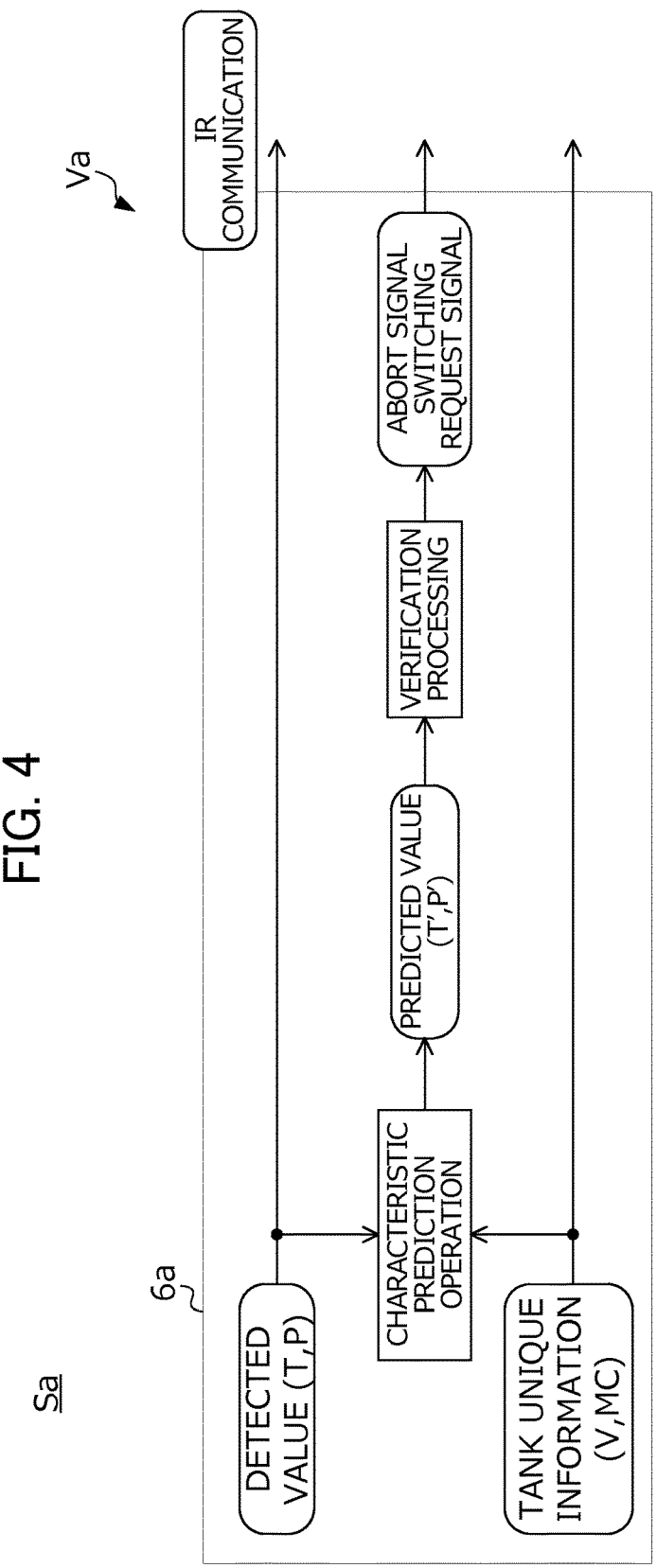
FIG. 4 is a functional block diagram of a communication operation ECU in the case of executing characteristic prediction operation and verification processing by the communication operation ECU equipped to the vehicle.

FIG. 4 is a functional block diagram of the communication operation ECU 6a in the case of executing the above-mentioned characteristic prediction operation and verification processing by the communication operation ECU 6a equipped to a vehicle Va, for a hydrogen filling system Sa capable of only unidirectional communication from the vehicle Va to the station.

In the characteristic prediction operation, the communication operation ECU 6a calculates the predicted value T' of the tank internal temperature, predicted value P' of the tank internal pressure, etc. following a predetermined algorithm, based on information sent to the station side (detected value T of tank internal temperature and detected value P of tank internal pressure) as well as unique information (volume value V and MC parameter value MC).

In verification processing, the communication operation ECU 6a compares the predicted values (T', P') successively calculated by the above-mentioned characteristic prediction operation and the detected values (T, P), and determines whether the respective predicted values and detected values match. Herein, in the case of determining that the respective predicted values and detected values do not match, an abort signal requesting hydrogen filling interruption from the station, or a filling mode switch request signal requesting to switch the filling mode established on the station side initially to a slower filling mode is sent.

In addition, in the above-mentioned embodiment, a case of the IR communication between the vehicle and station being unidirectional communication in which only the transmission of data signals from the vehicle side to the station side is possible is explained; however, the present invention can also be applied to a case of the IR communication being two-way communication. In the case of two-way communication being possible, since the predicted value calculated by the communication operation ECU on the vehicle side as shown in FIG. 4 and the predicted value calculated by the station ECU on the station side as shown in FIG. 2 can be compared, the accuracy of verification processing can be further improved.

In addition, in the above-mentioned embodiment, a case of sending the volume value V and MC parameter value MC as unique information of the hydrogen tank from the vehicle to station side is explained; however, the unique information of the hydrogen tank is not limited to these. This unique information sent from the vehicle may be information related to the heat capacity of the hydrogen tank. In addition, so long as the unique information is information from which it is possible to grasp the heat release characteristic of the hydrogen tank based on a predetermined standard by the station receiving this unique information, it is not necessarily physical information having physical meaning, and may be format information established according to a standard (for example, format numbers classified according to the material of the liner such as TYPE 3 (general term for high-pressure hydrogen tank using an aluminum liner), TYPE 4 (general term for high-pressure hydrogen tank using a resin-based liner), etc.).

What is claimed is:

1. A control method for a fuel filling system that fills fuel from an external filling device to a fuel tank equipped to a fuel cell vehicle, the method comprising the steps of:
   determining a filling mode based on a detected value of a vehicle sensor provided to the fuel cell vehicle and detecting a value of a predetermined physical quantity, wherein the physical quantity comprises a measure of physical characteristics of the state of fuel inside of the fuel tank, and separate unique information of the fuel tank not being detected by the sensor, wherein the unique information comprises a measure of characteristics of the fuel tank that are independent of the fuel inside the fuel tank, and then filling fuel to the fuel tank in the filling mode thus determined;
   predicting the value of the physical quantity during filling of fuel based on a detected value of an external sensor provided to the external filling device and the unique information, wherein the predicted value of the physical quantity is successively calculated during the filling in the step of predicting; and
   confirming continuously whether the detected value of the sensor and the predicted value in the step of predicting match, while filling fuel in the filling mode determined based on the unique information, and
   wherein the filling of fuel in the filling mode determined based on the unique information is interrupted, in the case of inconsistency between the detected value and the predicted value being confirmed in the step of confirming.

2. The control method for a fuel filling system according to claim 1,
   wherein the determining of the filling mode based on the unique information includes a value of a parameter related to a heat release characteristic of the fuel tank during filling of fuel, and
   wherein the determining of the filling mode based on the physical quantity includes a temperature of the fuel inside of the fuel tank.

3. The control method for a fuel filling system according to claim 1,
   wherein the determining of the filling mode based on the unique information includes a volume value of the fuel tank, and
   wherein the determining of the filling mode based on the physical quantity includes a pressure inside of the fuel tank.

4. The control method for a fuel filling system according to claim 1,
   wherein the fuel cell vehicle comprises: the fuel tank, the vehicle sensor, and a communication device that sends data signals including information related to the detected value of the vehicle sensor and the unique information to the external filling device, and
   wherein the steps of determining, predicting and confirming are performed on a side of the external filling device.

5. The control method for a fuel filling system according to claim 2,
   wherein the fuel cell vehicle comprises: the fuel tank, the vehicle sensor, and a communication device that sends data signals including information related to the detected value of the vehicle sensor and the unique information to the external filling device, and
   wherein the steps of determining, predicting and confirming are performed on a side of the external filling device.

6. The control method for a fuel filling system according to claim 3,
   wherein the fuel cell vehicle comprises: the fuel tank, the vehicle sensor, and a communication device that sends data signals including information related to the detected value of the vehicle sensor and the unique information to the external filling device, and
   wherein the steps of determining, predicting and confirming are performed on a side of the external filling device.

7. The control method for a fuel filling system according to claim 1,
   wherein the fuel cell vehicle comprises: the fuel tank, the vehicle sensor, and a communication device that sends data signals including information related to the detected value of the vehicle sensor and the unique information to the external filling device,
   wherein the steps of predicting and confirming are performed on a side of the fuel cell vehicle, and
   wherein the step of determining is performed on a side of the external filling device.

8. The control method for a fuel filling system according to claim 2,
   wherein the fuel cell vehicle comprises: the fuel tank, the vehicle sensor, and a communication device that sends data signals including information related to the detected value of the vehicle sensor and the unique information to the external filling device,
   wherein the steps of predicting and confirming are performed on a side of the fuel cell vehicle, and
   wherein the step of determining is performed on a side of the external filling device.

9. The control method for a fuel filling system according to claim 3,
   wherein the fuel cell vehicle comprises: the fuel tank, the vehicle sensor, and a communication device that sends data signals including information related to the detected value of the vehicle sensor and the unique information to the external filling device,
   wherein the steps of predicting and confirming are performed on a side of the fuel cell vehicle, and
   wherein the step of determining is performed on a side of the external filling device.

10. The control method for a fuel filling system according to claim 1,
    wherein the determining of the filling mode based on the unique information includes a volume value of the fuel tank,
    wherein the determining of the filling mode based on the physical quantity includes a total amount of the fuel filled into the fuel tank, and wherein the determining of the filling mode based on the detected value of the external sensor includes a flow meter that is provided to the external filling device, and detects the total amount of fuel.

\* \* \* \* \*